United States Patent
Ruoff et al.

(10) Patent No.: US 12,040,103 B2
(45) Date of Patent: Jul. 16, 2024

(54) IMAGING OPTICAL ARRANGEMENT TO IMAGE AN OBJECT ILLUMINATED BY X-RAYS

(71) Applicant: Carl Zeiss SMT GmbH, Oberkochen (DE)

(72) Inventors: Johannes Ruoff, Aalen (DE); Heiko Feldmann, Aalen (DE)

(73) Assignee: Carl Zeiss SMT GmbH, Oberkochen (DE)

(*) Notice: Subject to any disclaimer, the term of this patent is extended or adjusted under 35 U.S.C. 154(b) by 0 days.

(21) Appl. No.: 17/402,819

(22) Filed: Aug. 16, 2021

(65) Prior Publication Data

US 2023/0050439 A1 Feb. 16, 2023

(51) Int. Cl.
  *G01N 23/083* (2018.01)
  *G01N 23/04* (2018.01)
  *G21K 7/00* (2006.01)

(52) U.S. Cl.
  CPC ............... *G21K 7/00* (2013.01); *G01N 23/04* (2013.01); *G01N 23/083* (2013.01)

(58) Field of Classification Search
  CPC ......... G21K 7/00; G01N 23/04; G01N 23/083
  See application file for complete search history.

(56) References Cited

U.S. PATENT DOCUMENTS

| | | | |
|---|---|---|---|
| 5,012,498 A | 4/1991 | Cuzin et al. | |
| 5,365,566 A | 11/1994 | Maas | |
| 6,774,983 B2 | 8/2004 | Kuchibhotla | |
| 7,057,187 B1 | 6/2006 | Yun et al. | |
| 7,130,375 B1 | 10/2006 | Yun et al. | |
| 8,571,175 B2 | 10/2013 | Clemen, Jr. et al. | |
| 8,971,483 B2 | 3/2015 | Sasaki et al. | |
| 9,129,715 B2 | 9/2015 | Adler et al. | |

(Continued)

FOREIGN PATENT DOCUMENTS

| | | | |
|---|---|---|---|
| DE | 4228082 | 9/1993 | |
| DE | 102018209570 | 12/2018 | ............ G06T 11/00 |
| DE | 102018201250 | 6/2019 | |

OTHER PUBLICATIONS

The International Search Report and Written Opinion for International Application No. PCT/EP2022/070678, dated Oct. 21, 2022.

(Continued)

*Primary Examiner* — David P Porta
*Assistant Examiner* — Mamadou Faye
(74) *Attorney, Agent, or Firm* — Fish & Richardson P.C.

(57) ABSTRACT

An imaging optical arrangement serves to image an object illuminated by X-rays. An imaging optics serves to image a transfer field in a field plane into a detection field in a detection plane. A layer of scintillator material is arranged at the transfer field. A stop is arranged in a pupil plane of the imaging optics. The imaging optics has an optical axis. A center of a stop opening of the stop is arranged at a decentering distance with respect to the optical axis. Such imaging optical arrangement ensures a high quality imaging of the object irrespective of a tilt of X-rays entering the transfer field. The imaging optical arrangement is part of a detection assembly further comprising a detection array and an object mount. Such detection assembly is part of a detection system further comprising a X-ray source.

18 Claims, 3 Drawing Sheets

(56) References Cited

U.S. PATENT DOCUMENTS

| | | |
|---|---|---|
| 10,014,153 B2 | 7/2018 | Kohhno |
| 10,295,485 B2 | 5/2019 | Yun et al. |
| 10,324,050 B2 | 6/2019 | Hench et al. |
| 10,606,048 B2 * | 3/2020 | Ruoff .................... G02B 13/08 |
| 10,692,184 B2 | 6/2020 | Ratner et al. |
| 10,722,192 B2 | 7/2020 | Erler et al. |
| 11,009,471 B2 | 5/2021 | Muehlhauser |
| 11,042,981 B2 | 6/2021 | Adler et al. |
| 11,430,118 B2 | 8/2022 | Adler et al. |
| 11,615,533 B2 | 3/2023 | Adler et al. |
| 11,651,492 B2 | 5/2023 | Adler et al. |
| 11,688,067 B2 | 6/2023 | Adler et al. |
| 11,817,231 B2 | 11/2023 | Ruoff et al. |
| 2004/0027550 A1 * | 2/2004 | Kuchibhotla ....... G03F 7/70216 355/71 |
| 2012/0154823 A1 | 6/2012 | Sakamoto |
| 2016/0088205 A1 | 3/2016 | Horstmeyer et al. |
| 2016/0202193 A1 * | 7/2016 | Hench .............. G01N 23/20008 702/85 |
| 2017/0131528 A1 | 5/2017 | Ruoff et al. |
| 2017/0236684 A1 | 8/2017 | Kohno |
| 2018/0164690 A1 | 6/2018 | Ruoff et al. |
| 2019/0231286 A1 | 8/2019 | Erler et al. |
| 2021/0012499 A1 | 1/2021 | Adler et al. |

OTHER PUBLICATIONS

The Office Action issued by the German Patent Office for Application No. DE 10 2021 210 174.7 dated Feb. 17, 2022 (with English Machine Translation).

The Office Action issued by the German Patent Office for Application No. DE 10 2021 210 175.5 dated Jun. 21, 2022 (with English Machine Translation).

Gondrom et al., Digital computed laminography and tomosynthesis—functional principles and industrial applications, NDT.net, vol. 4, No. 7 (Jul. 1999).

* cited by examiner

IMAGING OPTICAL ARRANGEMENT TO IMAGE AN OBJECT ILLUMINATED BY X-RAYS

TECHNICAL FIELD

The invention refers to an imaging optical arrangement to image an object illuminated by X-rays. Further, the invention refers to a detection assembly including such an imaging optical arrangement and to a detection system including such a detection assembly. Further, the invention refers to an X-ray inspection method using such a detection system.

BACKGROUND

An imaging optical arrangement to image an object illuminated by X-rays is known from U.S. Pat. No. 7,057,187 B1, from U.S. Pat. No. 7,130,375 B1 and from U.S. Pat. No. 9,129,715 B2. Further, from DE 10 2018 209 570 A1 a method and a device to produce a three-dimensional image is known.

SUMMARY

In a general aspect, the invention establishes an imaging optical arrangement which enables a high quality imaging of the object irrespective of X-rays entering the transfer field in an oblique or tilted manner.

The above aspect is achieved by an imaging optical arrangement configured to image an object illuminated by X-rays, in which the imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis.

It has been realized by the inventors, that a stop arranged at a decentering distance with respect to the optical axis of the imaging optics of the imaging optical arrangement makes it possible to adapt such decentering distance to an angle of an oblique or tilted entry of X-rays to the transfer field of the imaging optics. With a respective decentering of the stop opening, a mean spot size of the imaging spots of points of origin from different positions of the layer of scintillator material can be kept advantageously small. This gives a good imaging from the transfer field to the detection field even in case of obliquely entering rays on the layer of scintillator material.

The stop opening of the stop of the imaging optical arrangement defines a pupil of the imaging optics.

In particular, it is possible to image object structures, which are smaller than 20 μm, smaller than 10 μm and in particular which are smaller than 1 μm. Examples for such structures are Cu—Cu hybrid bonding structures between microchips and substrate conductor paths. In particular, direct bonds between single dies or between a whole wafer onto a substrate wafer can be inspected.

In particular, a 3D tomographic reconstruction of an object sample under investigation by combining several 2D images taken from different directions is possible.

A decentering distance that is at least 10% of a width of the stop opening has proven to be good adapted to typical space requirements of detection systems and detection assemblies including such an imaging optical arrangement. The decentering distance can be larger than 10% of the stop opening width and can amount to 15%, 20%, 25%, 30%, 35%, 40% or even a larger fraction of the stop opening width. The decentering distance can be a continuous function of an angle of incidence of the X-ray illumination of the object. After measuring such X-ray angle of incidence, for a given imaging optical arrangement, a decentering distance value can be stored, e.g., in a look-up table to be adjusted within the imaging optics.

The stop opening of the stop can be a circular opening. In this case, the width of the stop opening also is its diameter. In case of a non-circular stop opening, the width can be calculated as a mean width measured across all possible directions of the stop opening in the arrangement plane of the stop.

The stop can be mounted on a decentering drive to translate the stop in the pupil plane. The decentering drive allows an adaption of the decentering distance. The decentering drive can be in signal connection to a control device of the imaging optical arrangement or of a detection assembly or a detection system utilizing the imaging optical arrangement. The control device can then control the action of the decentering drive to translate the stop. Such control can take place depending on another parameter fed to the control device. Such other parameter can be the result of a respective working condition of the imaging optical arrangement, the detection assembly or the detection system or can be the result of a measurement.

An object side NA of the imaging optics which is defined by the stop opening can be larger than 0.4. The object side NA enables an imaging of the object with sufficient resolution. Such object side NA can be 0.45, 0.5, 0.55, 0.6, 1.0, 1.2 or can be even larger. As a rule, such object side NA defined by the stop opening is smaller than 1.8. The object side numerical aperture can be larger than 1.0 since the scintillator material can have a refractive index which is larger than 1.0.

In another general aspect, a detection assembly includes an imaging optical arrangement configured to image an object illuminated by X-rays, in which the imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis. The detection assembly further includes a detection array arranged at the detection field of the imaging optics, and an object mount to hold an object to be imaged via the imaging optics.

The advantages of a detection assembly described above correspond to those discussed above with respect to the imaging optical arrangement. The detection array, the imaging optics and the object mount of the detection assembly can be mounted in fixed relationship.

In another general aspect, a detection system includes a detection assembly that includes an imaging optical arrangement configured to image an object illuminated by X-rays. The imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis. The detection assembly further includes a detection array arranged at the detection field of the imaging optics, and an object mount to hold an object to be imaged via the imaging optics. The detection system further includes an X-ray source.

The advantages of a detection system described above correspond to those discussed above with respect to the imaging optical arrangement and with respect to the detection assembly.

X-ray energies of the used X-rays can range between 5 keV and 160 keV, preferably between 15 keV and 90 keV.

The detection system can include a lateral displacement drive for relative lateral displacement of the object mount with respect to the X-ray source. The lateral displacement drive enables an automatic imaging measurement of the object with high quality. An imaging method which can be used utilizing such lateral displacement drive is disclosed in DE 10 2018 209 570 A1, the entire content of which is incorporated by reference.

During such lateral displacement of the object mount with respect to the X-ray source, a direction of the optical axis of the imaging optics can remain unchanged, i.e. may not be tilted. In particular, during lateral displacement of the object mount, the object and the imaging optical arrangement can remain in fixed spatial relationship.

Balancing of the lateral displacement of the X-ray source with respect to the optical mount on the one hand and with the stop opening decentering on the other, enables high quality imaging with low mean effective spot sizes of the imaging of the transfer field to the detection field despite the fact that imaging light is produced over the whole thickness of the scintillator material perpendicular to the transfer field plane via a X-ray path, which is oblique or tilted with respect to a normal to the transfer field plane. The stop opening decentering involved in the balancing described above can include adjusting the decentering distance of the center of the stop opening with respect to the optical axis of the imaging optics. The chief imaging rays of the imaging light within the imaging optics are defined as the center rays of the light bundles emanating from the scintillator material layer. Alternatively, such chief imaging rays can be defined as those rays which carry the direction of the main imaging light energy.

An angle between the X-rays entering the transfer field and the optical axis of the imaging optics can be between 0 deg and 80 deg. The angle described above has proven to give good imaging results, in particular good three-dimensional imaging results when using a method according to DE 10 2018 209 570 A1. Such angle can be between 10 deg and 30 deg and can be in the range of 20 deg.

The detection system can include a control device that is in signal connection with the decentering drive and with the lateral displacement drive. The control device enables a control of the decentering drive depending on the lateral displacement effected by the lateral displacement drive. This enables an automatic measuring process to produce a three-dimensional image of the object. Data with respect to the dependency between the actions of the decentering drive on the one hand and of the lateral displacement drive on the other can be gathered from a look-up table. Such look-up table can be produced in a preparational calibration step of the detection system.

In another general aspect, an X-ray inspection method uses a detection system that includes a detection assembly including an imaging optical arrangement configured to image an object illuminated by X-rays. The imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis. The detection assembly further includes a detection array arranged at the detection field of the imaging optics, and an object mount to hold an object to be imaged via the imaging optics. The detection system further includes an X-ray source. The decentering distance of the stop opening of the stop is adapted to an angle of an oblique or tilted entry of X-rays to the transfer field of the imaging optics. Advantages of the X-ray inspection method described above correspond to those discussed above with respect to the detection system.

The detection system can comprise a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane. The shield stop and the detection array can be moved synchronously relative to the object to be inspected to realize different object imaging projections.

Synchronous movement of the shield stop, the detection array and the object ensures that a used light path of the X-rays to illuminate the object always impinges on the object at a desired object region to be imaged to result in the desired object imaging projection.

DESCRIPTION OF DRAWINGS

Exemplified embodiments of the invention hereinafter are described with reference to the accompanying figures. In these show.

DETAILED DESCRIPTION

Figure 1:
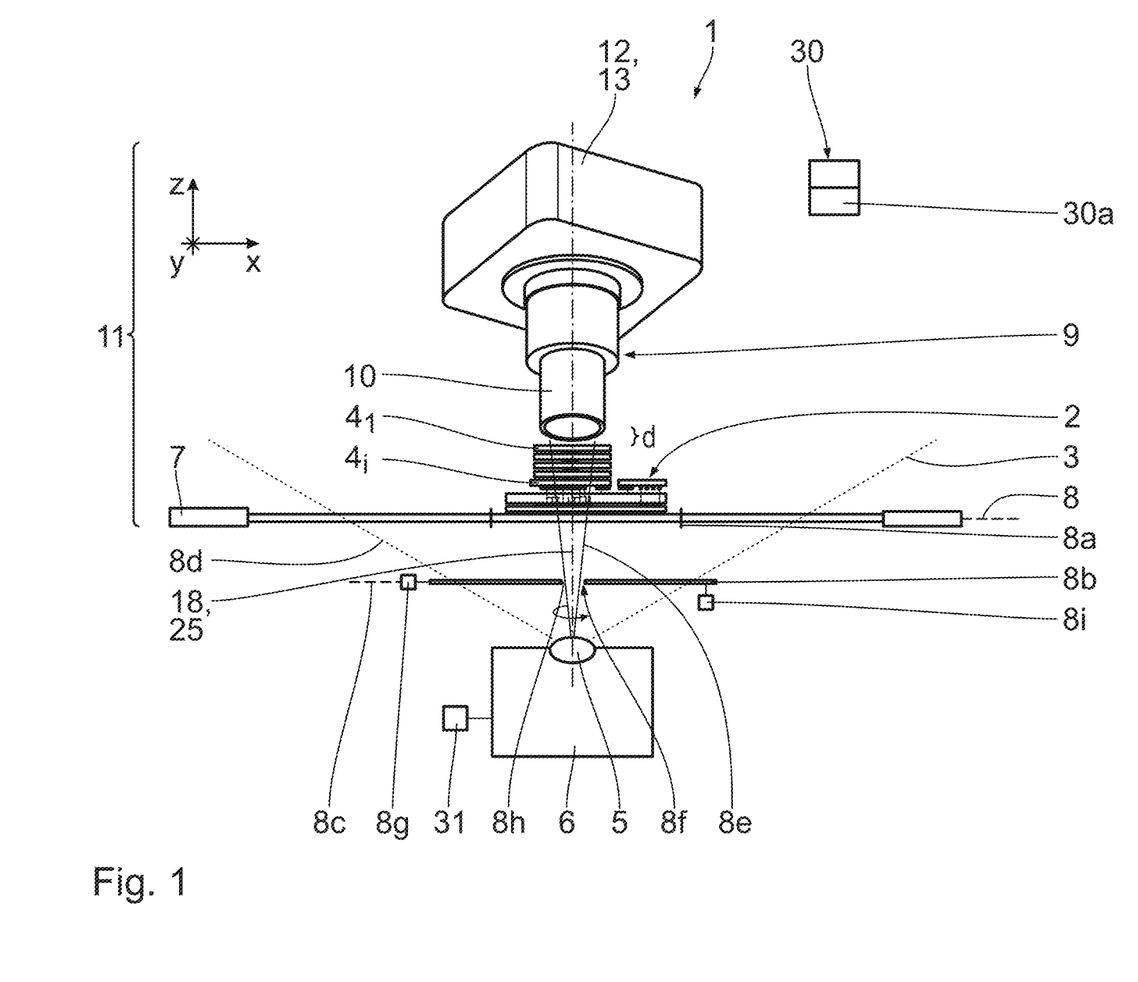
FIG. 1 partly schematical and partly in a perspective depiction a side-view of a detection system including a detection assembly having an imaging optical arrangement to image an object illuminated by X-rays embodied as a microscope objective shown in a first position of the detection assembly including an object mount relative to an X-ray source of the detection system.

A detection system 1 serves to investigate or inspect an object 2 which is illuminated by X-rays 3. The detection system 1 in particular serves to investigate the quality of packaging, i.e. the quality of mechanical and electrical bonding of electronic components in particular on a chip with micro- and/or nanostructures. Such electronic components often are arranged in a layered, three-dimensional (3D) structure. In FIG. 1 several layers $4_i$ (i=1 . . . 3, 5, 7, 10 or more) are shown.

To facilitate the further description, a Cartesian x-y-z-coordinate system is used hereinafter. In FIG. 1, the x-direction points to the right, the y-direction is perpendicular to the drawing plane and points away from the viewer and the z-direction points upwards.

The layers $4_i$ are stacked in the z-direction.

The X-rays 3 are emitted from a source region 5 of an X-ray source 6. The X-rays 3 are emitted within an emission cone in which the object 2 is arranged. A typical cone angle of such emission cone is in the range between 90 deg and 175 deg and can be 170 deg. A spot size of the source region 5 can be in the range between 1 μm and 100 μm, depending on the type of the light source 6. A continuous power of the light source 6 can be in the range between 1 W and 200 W and can be, again depending on the type of the light source, 20 W or 50 W.

The X-ray source 6 can be from the type of an open transmissive source or of a liquid metal jet source. An example for an open transmissive X-ray source is a source from the product line "TCHE+" offered from X-RAY WorX GmbH, Germany. An example for a liquid metal jet source is the source "metal jet D2+70 kV" offered by Excillum AB.

The object 2 is held by an object mount 7 defining an object plane 8. The object 2 is arranged with respect to the x-y-dimensions within an object field 8a. The object mount 7 is capable to mount objects 2 having a diameter of up to 300 mm or larger.

The object mount 7 can be embodied as a ring mount to have no additional mount material between the used light path 8e and the object 2. Alternatively, the object mount 7 can include a thin organic tray or a multitude of such trays. Such organic tray functions to minimize an absorption of the used X-rays 3. Alternatively, an aluminum and/or glass tray with an appropriate dopant can be used as part of the object mount 7 to filter a low, unwanted energy part of the spectrum of the X-rays 3.

X-ray energies below 10 keV or 15 keV are filtered via a respective object mount side filter. A typical thickness of the organic tray/the aluminum and/or glass tray in a respective embodiment of the object mount 7 can be in the range between 1 mm and 5 mm.

The glass tray can contain appropriate amounts of dopants materials such as Pb, B, As, Bi, Cd, Co, U in particular to optimize the filtering of low energy X-rays.

Between the source region 5 and the object mount 7, a shield stop 8b is arranged in an arrangement plane 8c. The shield stop 8b is arranged in a general light path 8d of the X-rays 3 and serves to select a usable light path 8e within the total light path 8d defined by the emission cone of the light source 6. In particular, the shield stop 8b protects uninspected regions of the object 2 from X-ray exposure. The shield stop 8b has a stop opening 8f, which also is referred to as a shield stop aperture. Through the shield stop aperture 8f, the usable light path 8e propagates which in the further, downward beam path impinges on the object 2.

The shield stop aperture 8f is transmissive for the X-rays 3, which is used to image the object 2. Such shield stop aperture 8f can be circular, can be a square aperture or can be rectangular. Other boundaries contours of the shield stop aperture 8f are possible, e.g. a hexagonal contour.

The shield stop 8b is movable via a shield stop displacement drive 8g along at least one stop displacement direction x/y in the arrangement plane 8c.

Such movement of the shield stop 8b executed via the shield stop displacement drive 8g can be a linear displacement along at least one linear displacement direction, e.g. along x/y. Alternatively and depending on the embodiment of the shield stop displacement drive 8g, the movability of the shield stop 8b can be along two displacement directions, e.g. x and y, spanning up the arrangement plane 8c. In an alternative or additional embodiment of the shield stop displacement drive 8g, the shield stop 8b can be movable along at least one curved direction and in particular can be movable along at least one circular direction.

The shield stop 8b can be configured such that the shield stop aperture 8f is variable in size. In particular, the shield stop 8b can be configured as an iris stop with variable size of the stop opening 8f. Such stop opening size/shape variation can be effected by a respective shield stop aperture drive (not shown).

Figure 1A:
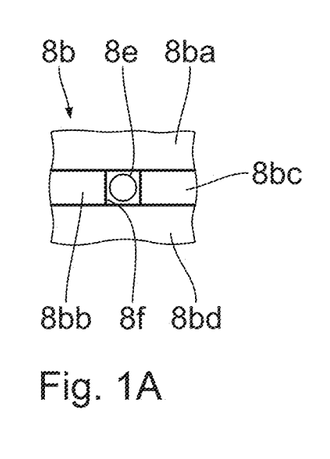
FIG. 1A is an insert of FIG. 1 showing a plane xy view of a shield stop.

As shown in the insert FIG. 1A showing a plane xy view of the shield stop 8b, in an embodiment of the shield stop 8b, this can comprise several shield blades 8ba, 8bb, 8bc and 8bd, which together define the shield stop aperture 8f.

In the embodiment shown in FIG. 1A, the blades 8ba to Bbd are arranged in two pairs 8ba, 8bb and 8bc, Bbd of blades which define the extent of the shield stop aperture 8f from opposing sites. Viewed from the direction of FIG. 1A, the blades 8bc, Bbd are arranged below the blades 8ba, 8bb. A z distance between these blade pairs 8ba, 8bb and 8bc, Bbd can be very small and can be in the range between 1 μm and 100 μm.

As indicated by a dashed line in FIG. 1, the shield stop aperture 8f can be equipped with a filter 8h. Such filter has the function to filter out the low energy part of the x-ray spectrum coming from the source.

The detection system 1 can include a shield stop exchange mount 8i, which is indicated schematically in FIG. 1. Such shield stop exchange mount 8i has the function to exchange between different field stops 8b, in particular to exchange between shield stops 8b with different shield stop apertures 8f and/or to replace a shield stop 8b after its nominal time of use.

The material of the shield stop 8b can be from highly absorptive material, e.g. lead, tungsten alloys. A z thickness of the shield stop 8b is in the range between 100 μm and 1 mm.

The object 2 is imaged via an imaging optical arrangement 9 including an imaging optics 10 being embodied as a microscope objective. The imaging optical arrangement 9 is part of a detection assembly 11, which also includes the object mount 7 and a detection array 12 held within a detection housing 13. The detection array 12 can be a CCD or a CMOS array. The detection array 12 can be configured as a flat panel detector. The detection array 12 can have a minimum image read out time according to 10 frames per second (fps). Such image read out time can be smaller to achieve a higher fps value, in particular more than 10 fps, more than 25 fps and more than 50 fps. As a rule, the image read out time is larger than 5 ms.

The detection assembly 11 has a large field of view (FOV). The FOV depends strongly on the magnification of the used microobjective and can span a range from 70 mm for a 0.4× objective down to 0.7 mm for a 40× objective. Of course, the FOV depends on the size of the detection array 12.

The imaging optical arrangement 9 can be arranged such that the imaging optics 10 is exchangeable, in particular to switch between different magnification scales.

During a respective imaging measurement, the detection array 12, the imaging optics 10 and the object mount 7 are arranged in a fixed spatial relationship to each other. This component group 7, 10 and 12 is moved relative to the X-ray source 6 as is described further down below. For imaging/ adjustment purposes, the detection array 12, the imaging optics 10 and the object mount 7 can be adjustable to each other in particular in the z-direction.

A typical distance d between the imaging optics 10 and the object 2 is in the range of 1 mm.

A typical minimum distance between the object plane 8, i.e. the arrangement plane of the object mount 7, and the arrangement plane 8c of the shield stop 8b is 1 mm. A typical minimum distance between the source region 5 of the X-ray source 6 and the shield stop 8b is in the range of 1 mm.

The resulting low distance between the source region 5 and the object 2 results in a maximum throughput of the used light path 8e. Further, such minimum distance between the object 2 and the imaging optics 10 results in a maximum resolution of the object imaging.

Further details of the imaging optical arrangement 9 hereinafter also are discussed referring to FIG. 3.

The imaging optics 10 of the imaging optical arrangement 9 serves to image a transfer field 14 in a field plane 15 into a detection field 16 in a detection or image plane 16a. Such imaging can be done according to the respective embodiment of the imaging optics 10 with a magnification of 1 or with a magnification which is larger than 1, e.g. 2, 3, 4, 5, 8, 10, 15, 20, 25, 50, 100 or even larger.

A typical magnification value can be in the range of 4 to 40.

The detector array 12 of the detection assembly 11 is arranged at the detection field 16 of the imaging optics 10. The detection array 12 can be movable with respect to the position of the image plane 16a of the imaging optics 10 along the z-direction.

As a rule, the X-rays 3 from the X-ray source 6 produce a projection image on the scintillator material layer 17 via radiographically shading casting. No X-ray optics in such embodiment is present to influence a direction of the X-rays 3 within the usable light path 8e.

At the transfer field 14 a layer 17 of scintillator material is arranged. The thickness of such scintillator layer 17 corresponds to the z-extension of the transfer field 14 volume to be imaged by the imaging optics 10. A typical z-extension of the scintillator layer 17, i.e. a typical thickness of such layer 17, is 1 µm to 500 µm and in particular is in the range between 5 µm and 50 µm. The scintillator material layer 17 produces imaging light which can be in the near UV range, in the visible range or in the near infrared region from the X-rays 3 entering the layer 17.

Dependent on the respective embodiment, further X-ray optics can be present to image the object field 8a in the object plane 8 into the transfer field 14.

The imaging optics 10 has an optical axis 18 which also is referred to as a reference axis. The optical components of the imaging optics 10 which can be lenses and/or mirrors exhibit with respect to such reference axis 18 at least a certain degree of symmetry and in particular can exhibit rotational symmetry with respect to such reference axis. In the schematical depiction of the imaging optics 10, two of these optical components 18a, 18b are very schematically indicated.

Figure 3:
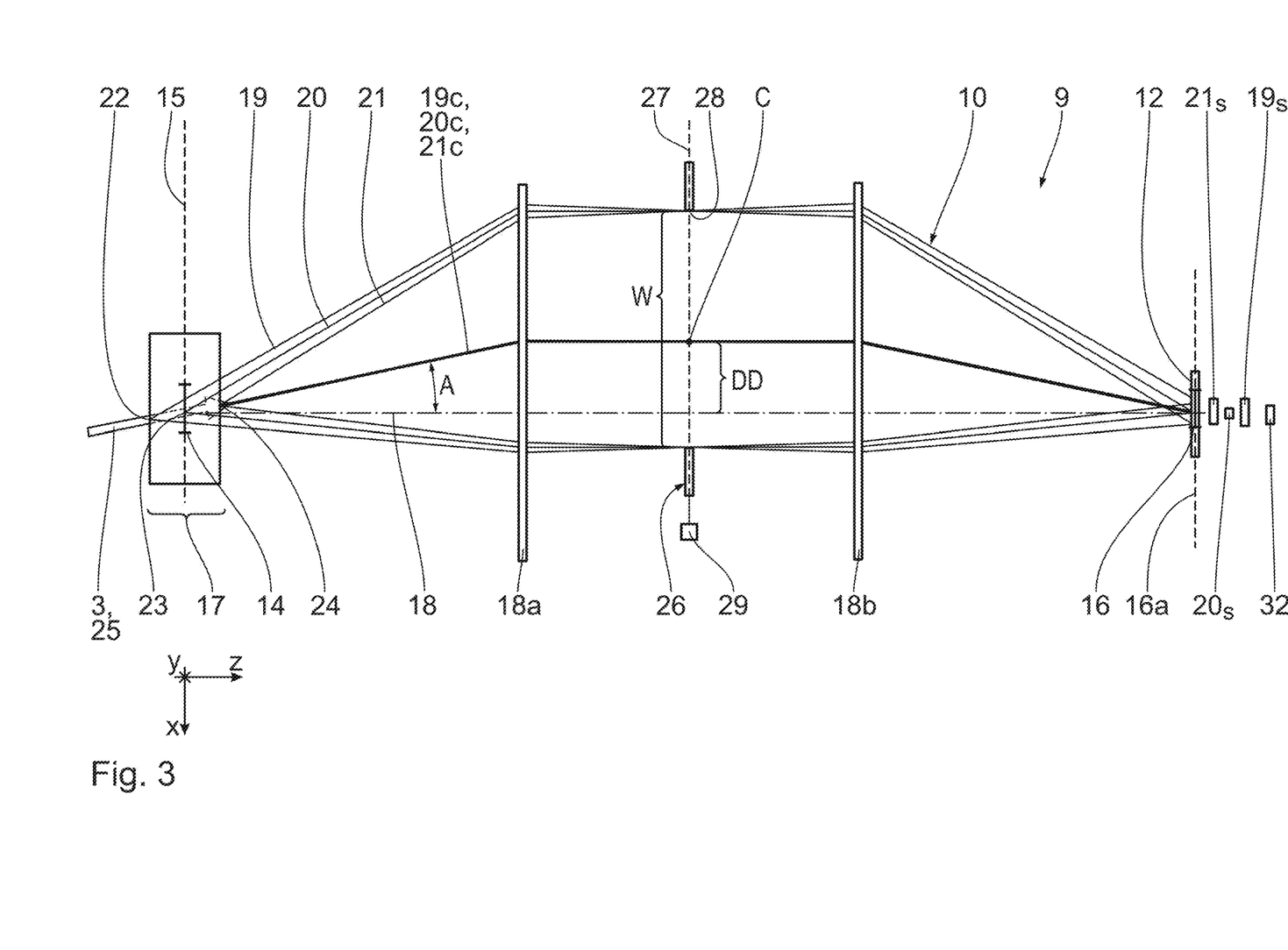
FIG. 3 in a meridional and schematic section the imaging optical arrangement with highlighted rays of an imaging beam path emerging from different points of a scintillator layer along tilted X-rays coming from the object and entering a transfer field to be imaged by the imaging objects of the imaging optical arrangement.

In FIG. 3, an imaging light path between the transfer field 14 and the detection field 16 is indicated by exemplified rays 19, 20, 21 which emerge from three different points of origin 22, 23, 24 from the scintillator layer 17. As exemplified examples of the rays 19, 20, 21 two marginal rays and a chief ray 19c, 20c, 21c are shown. The chief rays or chief imaging rays 19c, 20c, 21c of the imaging light path within the imaging optics 10 are defined as the center rays of the light bundles emanating from the respective points of origin 22, 23, 24 of the scintillator layer 17. Alternatively, such chief imaging rays 19c, 20c, 21c can be defined as those rays which carry the direction of the main imaging light energy.

Point of origin 22 is located at an entrance of an exemplified X-ray 25 from the entering X-rays 3 into the scintillator layer 17. Point of origin 23 is located at the crossing point of the X-ray 25 with the field plane 15, in particular in the middle of the z-extension of the scintillator layer 17. Point of origin 24 is located at the exit of the X-ray 25 from the scintillator layer 17.

In the beam path depicted in FIG. 3, the X-ray 25 enters the transfer field 14 at an angle A to the optical axis 18. Such angle can be in the range between 0 deg and 80 deg. As a result and as a rule, the different points of origin 22 to 24 have different x-coordinates and also, of course, different z-coordinates.

The imaging optics 10 further includes a pupil stop 26 which is arranged in a pupil plane 27 of the imaging optics 10. The pupil stop 26 defines the direction of the marginal rays of the respective ray bundles emerging from the different points of origin from the scintillator layer 17. The chief rays 19c, 20c, 21c run collinearly.

The center C of the stop opening 28 of the pupil stop 26 is arranged at a decentering distance DD with respect to the optical axis 18.

The stop opening 28 defines a pupil of the imaging optics 10. A usable object side numerical aperture (NA) of the imaging optics 10, which is defined by the stop opening 28 of the pupil stop 26, i.e. a usable object side NA, is larger than 0.4. In the embodiment shown, the usable object side NA of the imaging optics 10 can amount to 0.6. The usable object side numerical aperture can be 0.5.

The decentering distance DD is at least 10% of a typical width W, in particular of a diameter of the stop opening 28. Such ratio DD/W can be in the range between 10% and 50%, in particular in the range between 25% and 35%.

The pupil stop 26 is mounted on a decentering drive 29. Such decentering drive 29 serves to translate the pupil stop 26 in the pupil plane 27. Such translation can be done along the x-axis and the y-axis or in any direction in the x-y plane. The decentering drive 29 is in signal connection (not shown) to a control unit 30a of a control device 30 of the detection system 1 (compare FIG. 1).

The detection assembly 11 includes a lateral displacement drive 31. Such lateral displacement drive 31 serves for relative lateral displacement in the x- and/or y-direction of the object mount 7 with respect to the X-ray source 6. In the embodiment shown in FIGS. 1 and 2, the lateral displacement drive 31 is connected to the X-ray source 6. In an alternative basic configuration the source 6 remains fixed and only the detection assembly 11 including the object mount 7 holding the object 2 and the shield stop 8b move. Thus, depending on the respective embodiment, such lateral displacement drive alternatively or in addition can be connected to a frame holding in particular the object mount 7. Such frame also can hold the imaging optical arrangement 9 and in particular can hold the whole detection assembly 11.

The control unit 30a of the control device 30 further is in signal connection (not shown) with the lateral displacement drive 31. Further, the control unit 30a of the control device 30 is in signal connection (not shown) with the shield stop displacement drive 8g.

Figure 2:
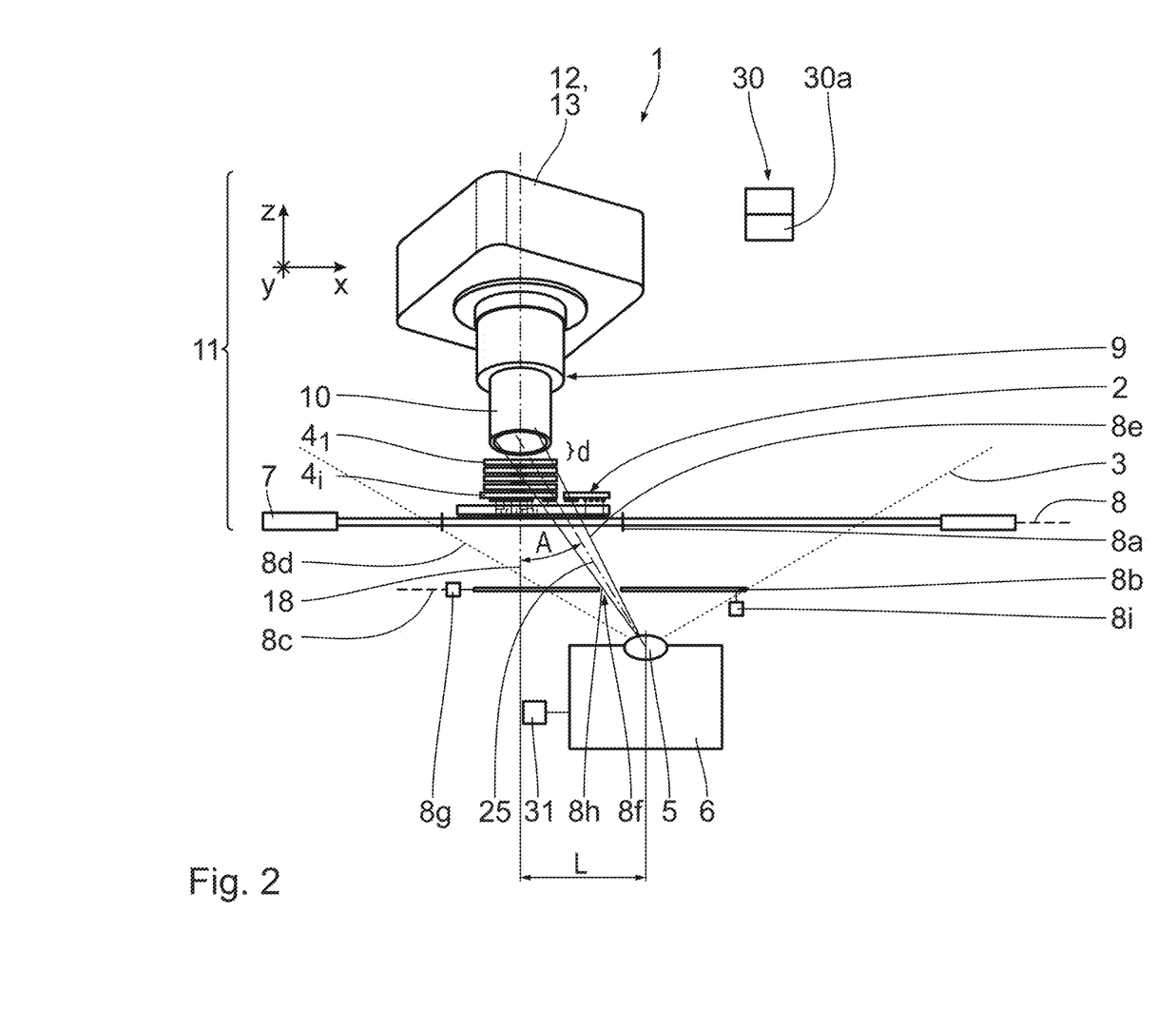
FIG. 2 in a view similar to FIG. 1 the detection system in a further position of the detection assembly including the object mount relative to the X-ray source which compared to FIG. 1 is laterally displaced.

FIG. 2 shows the effect of the lateral displacement drive 31. Compared to FIG. 1, the X-ray source 6 is displaced in positive x-direction relative to the detection assembly 11. As mentioned above, such x-displacement can be caused by a lateral displacement drive (not shown) displacing the whole detection assembly 11 and/or by the lateral displacement drive 31 displacing the X-ray source 6. Due to its effect to laterally displace the object mount 7, the lateral displacement drive 31 also is referred to as an object displacement drive. This results in an oblique illumination of the object 2 with the X-rays 25 according to the angle A explained above with respect to FIG. 3. In contrast, in the initial configuration of the X-ray source 6 according to FIG. 1, such X-rays 25 run along the z-direction, i.e. impinge perpendicularly on the object plane 8. By the effect of the lateral displacement drive 31, the object mount 7 is movable relative to the light source 6 along at least one object displacement direction x/y in the object plane 8. Such movability of the object mount 7 via the lateral displacement drive 31 can be along at least one linear displacement direction x and/or y. In an alternative or additional embodiment, the object mount 7 can be movable via the lateral displacement drive 31 or a respective lateral displacement drive acting on the object mount 7 along at least one circular direction relative to the light source 6. Such circular direction in FIG. 1 schematically is represented by an arrow C. As an alternative or an addition a movement is possible along an arbitrary path in two dimensions. Such arbitrary path also can run along a 3D path.

As shown schematically in FIG. 2, in accordance with the lateral movement of the X-ray source 6 relative to the detection assembly 11, the shield stop 8b also is laterally displaced via the shield stop displacement drive 8g to ensure that the used light path 8e of the X-rays 3 impinges on that part of the object to be imaged by the detection system 1. Doing so, the movements of the shield stop displacement drive 8g, of the lateral displacement drive 31 and also of the pupil stop displacement drive 29 are synchronized via the control unit 30a of the control device 30.

The lateral displacement L (compare FIG. 2) of the X-ray source 6 with respect to the object mount 7 and the further components of the detection assembly 11 on the one hand and the decentering distance DD of the center C of the stop opening 28 with respect to the optical axis 18 of the imaging optics 10 on the other are balanced such that the X-rays 25 entering the transfer field 14 run parallel to the chief rays 19c, 20c, 21c.

The control unit 30 serves to control the decentering drive 29 of the pupil stop 26 and the shield stop displacement drive 8g depending on the lateral displacement of the X-ray source 6 effected by the lateral displacement drive 31. Such corresponding drive amount triples of (1) the decentering drive 29, of (2) the shield stop displacement drive 8g and of (3) the lateral displacement drive 31, which result (1) in a balancing of the X-ray 25 direction through the center of the shield stop aperture 8f and (2) in a balancing of the X-ray 25 direction parallel to the chief rays 19c to 21c direction, can be stored in a look-up table of the control device 30.

The detection system 1 is operated as follows:

In the initial configuration according to FIG. 1, the X-rays, which can be in the typical x-ray band and can have energies between 10 keV and 160 keV, produce an object image in the transfer field 14 and are converted by the scintillator layer 17 to a wavelength range in particular in the near UV range, in the visible range or in the near infrared region, which is detectable by the detection array 12. Such converted imaging rays, e.g. the imaging rays 19 to 21, then are imaged via the imaging optics 10 onto the detection array 12 thereby producing an image of the transfer field 14 in the detection field 16 and thereby producing an image of the object 2 on the detection array 12.

By using a method described in DE 10 2018 209 570 A1, different object imaging projections are utilized via the lateral displacement of the X-ray source 6 as explained above. By doing so, a very small distance between the entrance of the imaging optics 10, i.e. the scintillator layer 17 and the nearest layer $4_1$ of the object 2 is ensured in order to minimize transfer errors from the object 2 to the transfer field 14. The minimum distance d (compare FIG. 1) can be in the range of 1 mm. Due to this minimum distance d, when laterally displacing the X-ray source 6 with respect to the detection assembly 11, no tilt of the optical axis 18 with respect to the z-axis is possible to adapt the imaging optics 10 to the oblique illumination by the X-rays 25. This results in the angle A explained above. The use of the decentered pupil stop 26 ensures the image produced in the detection field 16 is not compromised due to such obliquely entering X-rays 25, which produce points of origins of the imaging rays 19 to 21 produced in the scintillator layer 17 along a respectively oblique path (compare points of origin 22 to 24 in FIG. 3). The balancing of the decentering distance DD with the lateral displacement L results in a small mean effective spot size $19_s$, $20_s$, $21_s$ as exemplified shown with the spot images of the points of origin 22 to 24 in FIG. 3. An effective spot size 32 as depicted in FIG. 3 on the right-hand sight as a result is small. Such spot size can be calculated as the distance of the first airy root from the center of the respective airy disc. In particular in the x-dimension, due to the decentered stop opening 28 of the stop 26, the effective spot size 32 can be by a factor 1, 2 to 3 and in particular by a factor in the range between 1.5 and 2.5, in particular in the range around 2 smaller than an uncorrected spot size with a centered stop.

For example, using an object side numerical aperture of 0.4 defined by the stop opening 28 of the stop 26 and further using a wavelength of the imaging rays 19 to 21 of 400 nm, an effective spot size in the x- and in the y-direction can result, which is in the range of 1 μm (FWHM or full width at half maximum). Here, an angle A of the X-rays 25 to the optical axis 18 of 45° was used.

Further, the use of the shield stop 8b ensures that only that X-rays 3 passes the arrangement plane 8c, which is needed to illuminate the object 2 via the used light path 8e. This avoids unnecessary X-ray load on the object 2 and also on the components of the detection assembly 11.

A nominal object side numerical aperture (NA) of the imaging optics 10, which might be usable without constriction of the decentered pupil stop 26, is larger than the object side numerical aperture as defined by the stop opening 28. For example, in case of a width W of the stop opening 28 resulting in a usable object side numerical aperture of 0.6 and further in case of the angle A amounting to 20 deg, such nominal object side numerical aperture of the imaging optics 10 is (sin 20 deg=0.34) 0.6+0.34, i.e. is 0.94.

Larger nominal object side numerical apertures are possible by using immersion imaging optics 10. Examples and references for such further imaging optics are given in U.S. Pat. No. 7,057,187, the entire content of which is incorporated by reference. For example, the nominal object side numerical aperture of the imaging optics 10 can be up to 1.9.

U.S. Pat. No. 7,057,187 further gives examples for scintillating materials which can be used for the scintillating layer 17. A preferred material is CsI, having a refractive index of 1.95. Other scintillating material having refractive indices between 1.50 and 2.20 also can be used.

Possible scintillator materials for the scintillating layer 17 are NaI:Tl, CsI:Tl, CsI:Na, CsI, $BaF_2$, $CeF_3$, BGO, PWO:Y, LSO/LYSO or perovskites such as $CsPbBr_3$ and $CsPbI_3$.

While this specification contains many implementation details, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. The separation of various system components in the embodiments described above should not be understood as requiring such separation in all embodiments. Moreover, although features can be described above as acting in certain combinations and even initially claimed as such, one or more features from a claimed combination can in some cases be excised from the combination, and the claimed combination can be directed to a subcombination or variation of a subcombination.

Thus, particular embodiments of the invention have been described. Other embodiments are within the scope of the following claims. In addition, the actions recited in the claims can be performed in a different order and still achieve desirable results.

What is claimed is:

1. An imaging optical arrangement to image an object illuminated by X-rays, the imaging optical arrangement comprising
   an imaging optics to image a transfer field in a field plane into a detection field in a detection plane via an imaging light path,
   a layer of scintillator material arranged at the transfer field, and
   a stop being arranged in a pupil plane of the imaging optics,
   wherein the imaging optics has an optical axis,
   wherein a center of a stop opening of the stop is arranged at a decentering distance with respect to the optical axis.

2. The imaging optical arrangement of claim 1, wherein the decentering distance is at least 10% of a width of the stop opening.

3. The imaging optical arrangement of claim 1, wherein the stop is mounted on a decentering drive to translate the stop in the pupil plane.

4. The imaging optical arrangement of claim 1, wherein an object side numerical aperture of the imaging optics which is defined by the stop opening is larger than 0.4.

5. A detection assembly including an imaging optical arrangement of claim 1, the detection assembly further comprising
   a detection array arranged at the detection field of the imaging optics, and
   an object mount to hold an object to be imaged via the imaging optics.

6. A detection system including a detection assembly of claim 5, the detection system further comprising an X-ray source.

7. The detection system of claim 6, having a lateral displacement drive for relative lateral displacement of the object mount with respect to the X-ray source.

8. The detection system of claim 7, wherein
   a lateral displacement of the X-ray source with respect to the object mount and
   the decentering distance of the center of the stop opening with respect to the optical axis of the imaging optics
   are balanced such that X-rays entering the transfer field run parallel to chief imaging rays of imaging light within the imaging light path.

9. The detection system of claim 8, wherein an angle between the X-rays entering the transfer field and the optical axis of the imaging optics is between 0 deg and 80 deg.

10. An X-ray inspection method using a detection system of claim 6, wherein the decentering distance of the stop opening of the stop is adapted to an angle of an oblique or tilted entry of X-rays to the transfer field of the imaging optics.

11. The imaging optical arrangement of claim 2, wherein the stop is mounted on a decentering drive to translate the stop in the pupil plane.

12. The imaging optical arrangement of claim 2, wherein an object side numerical aperture of the imaging optics which is defined by the stop opening is larger than 0.4.

13. The detection assembly of claim 5, wherein the decentering distance is at least 10% of a width of the stop opening.

14. The detection assembly of claim 5, wherein the stop is mounted on a decentering drive to translate the stop in the pupil plane.

15. The X-ray inspection method of claim 10, comprising balancing a lateral displacement of the X-ray source with respect to the object mount and the decentering distance of the center of the stop opening with respect to the optical axis of the imaging optics such that X-rays entering the transfer field run parallel to chief imaging rays of imaging light within the imaging light path.

16. The X-ray inspection method of claim 15, comprising reading data from a lookup table that stores data with respect to a dependency between actions of the decentering drive and actions of the lateral displacement drive, and
   using the data from the lookup table to balance the lateral displacement of the X-ray source with respect to the object mount and the decentering distance of the center of the stop opening with respect to the optical axis of the imaging optics.

17. The X-ray inspection method of claim 15, wherein an angle between the X-rays entering the transfer field and the optical axis of the imaging optics is between 0 deg and 80 deg.

18. The X-ray inspection method of claim 10, comprising performing, using a lateral displacement drive, a relative lateral displacement of the object mount with respect to the X-ray source.

* * * * *